(12) United States Patent
Tsai et al.

(10) Patent No.: US 12,543,069 B2
(45) Date of Patent: Feb. 3, 2026

(54) USER EQUIPMENT AND METHOD RELATED TO REPORTING MANAGEMENT

(71) Applicant: Industrial Technology Research Institute, Hsinchu (TW)

(72) Inventors: Tzu-Jane Tsai, Hsinchu County (TW); Chun-Yuan Chiu, Pingtung County (TW); Jung-Mao Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 469 days.

(21) Appl. No.: 17/720,324

(22) Filed: Apr. 14, 2022

(65) Prior Publication Data

US 2023/0043510 A1 Feb. 9, 2023

Related U.S. Application Data

(60) Provisional application No. 63/229,514, filed on Aug. 5, 2021.

(30) Foreign Application Priority Data

Dec. 23, 2021 (TW) .................. 110148418

(51) Int. Cl.
H04W 28/02 (2009.01)
(52) U.S. Cl.
CPC ... H04W 28/0247 (2013.01); H04W 28/0268 (2013.01)
(58) Field of Classification Search
CPC ................ H04W 28/0247; H04W 28/0268
See application file for complete search history.

(56) References Cited

U.S. PATENT DOCUMENTS

| 9,161,013 | B2 | 10/2015 | Oyman |
| 9,722,929 | B2 | 8/2017 | Miklos et al. |
| 10,200,883 | B2 | 2/2019 | Bedekar et al. |
| 2010/0269044 | A1* | 10/2010 | Ivanyi ............ H04L 67/306 709/224 |

(Continued)

FOREIGN PATENT DOCUMENTS

| CN | 102474833 | 6/2015 |
| CN | 106454940 | 2/2017 |

(Continued)

OTHER PUBLICATIONS

3GPP, "3rd Generation Partnership Project; Technical Specification Group Radio Access Network; Study on NR QoE (Quality of Experience) management and optimizations for diverse services (Release 17)", 3GPP TR 38.890 V17.0.0, Apr. 9, 2021, pp. 1-18.

(Continued)

*Primary Examiner* — Ayaz R Sheikh
*Assistant Examiner* — David Zhijun Sun
(74) *Attorney, Agent, or Firm* — JCIPRNET

(57) ABSTRACT

A user equipment and a method related to reporting management are provided. In the method, event-triggered information is received for a quality of experience (QoE) measurement configuration. A pause indication is received. To send or pause one or more QoE reports is determined based on the event-triggered information. The QoE report is associated with the QoE measurement configuration.

14 Claims, 15 Drawing Sheets

(56) References Cited

U.S. PATENT DOCUMENTS

| | | | |
|---|---|---|---|
| 2013/0128756 A1 | 5/2013 | Zhang et al. | |
| 2019/0319868 A1 | 10/2019 | Svennebring et al. | |
| 2022/0038934 A1* | 2/2022 | Kumar | H04W 24/10 |
| 2022/0210031 A1* | 6/2022 | Hu | H04L 41/0806 |
| 2022/0264373 A1* | 8/2022 | Kim | H04W 76/30 |
| 2023/0156767 A1 | 5/2023 | Hu et al. | |
| 2023/0292166 A1 | 9/2023 | Centonza et al. | |
| 2023/0318941 A1* | 10/2023 | Rune | H04L 41/5009 |
| | | | 370/252 |
| 2024/0031253 A1* | 1/2024 | Liu | H04L 41/5067 |
| 2024/0137294 A1* | 4/2024 | Choi | H04L 41/0806 |
| 2024/0188175 A1 | 6/2024 | Liu et al. | |
| 2024/0236745 A1 | 7/2024 | He et al. | |
| 2025/0056277 A1* | 2/2025 | Babaei | H04W 24/08 |

FOREIGN PATENT DOCUMENTS

| | | |
|---|---|---|
| CN | 110870339 | 3/2020 |
| CN | 117016014 | 11/2023 |
| GB | 2543548 | 4/2017 |
| JP | 2023509014 | 3/2023 |
| TW | 201707482 | 2/2017 |
| TW | I722579 | 3/2021 |
| WO | 2013172648 | 11/2013 |
| WO | 2014089093 | 6/2014 |
| WO | 2020128657 | 6/2020 |

OTHER PUBLICATIONS

Qualcomm Inc., "QoE measurement collection and reporting continuity in mobility scenarios", 3GPP TSG-RAN WG3 Meeting #112e, R3-211735, May 17-27, 2021, pp. 1-4.

Ericsson, "pCR for TR 38.890: Handling of QoE Measurement and Reporting and Support for New Services", 3GPP TSG-RAN WG3 Meeting #111-e, R3-210527, Jan. 25-Feb. 4, 2021, pp. 1-12.

"Office Action of Taiwan Related Application, Application No. 110148419", issued on Jun. 20, 2022, p. 1-p. 8.

"Office Action of Taiwan Counterpart Application", issued on Jun. 15, 2022, p. 1-p. 15.

3GPP, "Technical Specification, 3rd Generation Partnership Project; Technical Specification Group Radio Access Network; Study on NR QoE (Quality of Experience) management and optimizations for diverse services (Release 17)." 3GPP TS 38.890 V17.0.0, Apr. 2021, pp. 1-18.

China Unicom et al., "New WID on NR QoE management and optimizations for diverse services", 3GPP TSG RAN Meeting #91-e, Electronic Meeting, RP-210913, Mar. 16-26, 2021, pp. 1-5.

3GPP, "Technical Specification, 3rd Generation Partnership Project; Technical Specification Group Services and System Aspects; Management and orchestration; 5G end to end Key Performance Indicators (KPI) (Release 17)." 3GPP TS 28.554 V17.1.1, Dec. 2020, pp. 1-39.

3GPP, "Technical Specification, 3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)." 3GPP TS 37.320 V16.3.0, Dec. 2020, pp. 1-35.

Lenovo, "Report from email discussion [AT114-e][027][QoE] Start and Stop (Lenovo)", 3GPP TSG RAN WG2 Meeting #114-e, Electronic, R2-2106661, May 19-27, 2021, pp. 1-16.

Qualcomm Incorporated, "QoE pause and resume handling", 3GPP TSG-RAN WG2 Meeting #114-e, Electronic, R2-2104992, May 19-27, 2021, pp. 1-7.

"Office Action of U.S. Related Application, U.S. Appl. No. 17/720,321", issued on Aug. 30, 2024, p. 1-p. 32.

* cited by examiner

USER EQUIPMENT AND METHOD RELATED TO REPORTING MANAGEMENT

CROSS-REFERENCE TO RELATED APPLICATION

This application claims the priority benefit of U.S. Provisional Application No. 63/229,514, filed on Aug. 5, 2021, and Taiwan Application No. 110148418, filed on Dec. 23, 2021. The entirety of each of the above-mentioned patent applications is hereby incorporated by reference herein and made a part of this specification.

BACKGROUND OF THE DISCLOSURE

1. Field of the Disclosure

The present disclosure generally relates to a communication technical field, in particular, to a user equipment and a method related to reporting management.

2. Description of Related Art

In new radio (NR) quality of experience (QoE), a disclosure layer measurement collection functionality is supported. This functionality enables the collection of disclosure layer measurements from user equipment (UE). The disclosure layer measurement configuration could be received from an operation, administration, and maintenance (OAM) entity or a core network (CN) entity, and QoE measurement would be performed on the disclosure layer of the UE based on the measurement configuration.

It should be noticed that radio access network (RAN) may face overload. The RAN overload may continue for several hours, e.g., half a day. In case of RAN overload, RAN can stop new QoE measurement configurations, release existing QoE measurement configurations and pause QoE measurement reporting. However, the pause operation may affect all QoE measurement configurations, and some QoE reports with high priority would also be paused. The QoE reports with high priority may pinpoint a specific performance. Without a reception of the QoE reports with high priority from UE, the network deployment or optimization may fail or generate a poor result.

SUMMARY OF THE DISCLOSURE

Accordingly, the present disclosure is directed to user equipment (UE) and a method related to reporting management.

In one of the exemplary embodiments, a method related to reporting management and adapted for UE, includes, but is not limited thereto, the following steps. Event-triggered information for a quality of experience (QoE) measurement configuration is received. A pause indication is received. To send or pause one or more QoE reports is determined based on the event-triggered information. The QoE report is associated with the QoE measurement configuration.

In one of the exemplary embodiments, a UE, includes, but is not limited thereto, a transceiver and a processor. The processor is coupled to the transceiver. The processor is configured to perform the following steps. Event-triggered information for a QoE measurement configuration is received. A pause indication is received. To send or pause one or more QoE reports is determined based on the event-triggered information. The QoE report is associated with the QoE measurement configuration.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
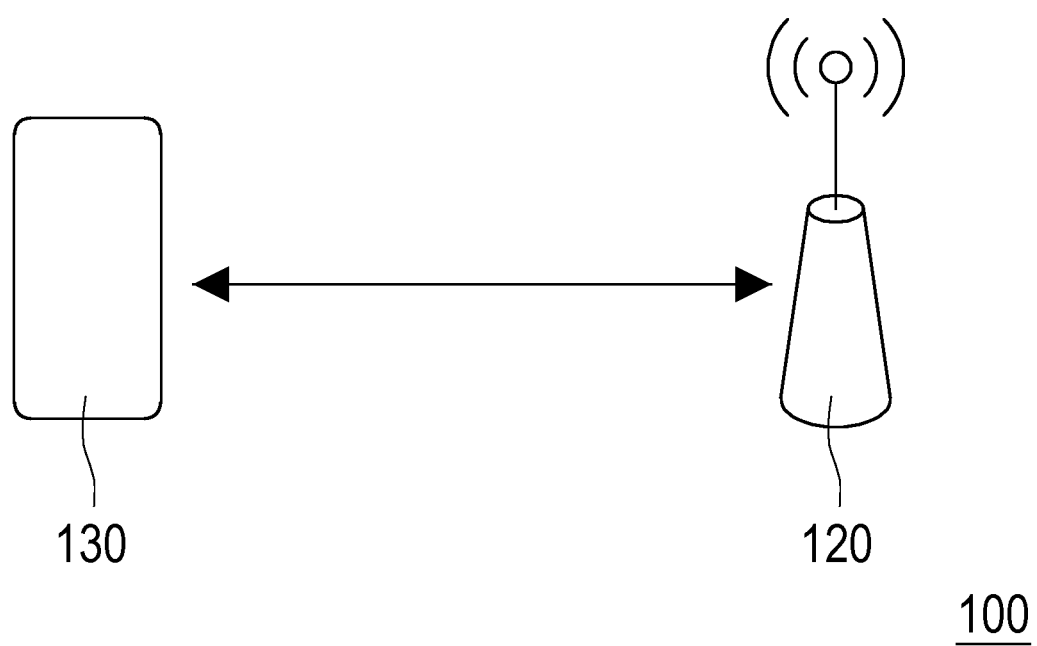
FIG. 1 is a schematic diagram illustrating a communication system according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

It should be understood that the technical solutions of the embodiments of the disclosure can be applied to various communication systems, such as global system for mobile (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD), universal mobile telecommunication system (UMTS), worldwide interoperability for microwave access (WiMAX) communication system, new radio (NR), the future 5G system, or the like.

FIG. 1 is a schematic diagram illustrating a communication system 100 according to one of the exemplary embodiments of the disclosure. Referring to FIG. 1, the communication system 100 may include network equipment 120, and the network equipment 120 (or referred to as radio accesss network (RAN) equipment) may be equipment that communicates with user equipment (UE) 130 (or referred to as terminal equipment). The network equipment 120 may provide communication coverage for a specific geographic area and may communicate with UE 130 located in the coverage area. Optionally, the network equipment 120 may be a base transceiver station (BTS) in a GSM system or a CDMA system, also a NodeB (NB) in a WCDMA system, an evolutional Node B, eNB or eNodeB in an LTE system, or a wireless controller in a cloud radio access network (CRAN); or the network equipment can be a mobile switching center, relay station, access point, vehicle-mounted device, wearable device, hub, switch, bridge, router, network equipment gNB in a 5G network, or network equipment in the future evolution of the public land mobile network (PLMN), and the like.

The communication system 100 also includes one or more UEs 130 disposed within the coverage area of the network equipment 120. "User equipment" as used herein includes, but is not limited to, terminal equipment, an access terminal, a user unit, a user station, a mobile station, a mobile platform, a remote station, a remote terminal, mobile equipment, a user terminal, a terminal, wireless communication equipment, a user agent, or a user device. The UE 130 can be a cellular phone, a cordless phone, a session initiation protocol (SIP) phone, a wireless local loop (WLL) station, a personal digital assistant (PDA), a handheld device with a wireless communication function, computing equipment, other processing equipment connected to a wireless modem, car equipment, wearable device, smart appliance, terminal equipment in the future network, terminal equipment in the future evolution of the PLMN, or the like. The embodiment of the invention is not limited thereto.

Optionally, the 5G system or 5G network may also be referred to as a new radio (NR) system or a NR network.

FIG. 1 illustrates one network equipment 120 and one UE 130. Optionally, the communication system 100 may include multiple network equipments 120 and the coverage of each network equipment 120 may include UE 130 in other quantities, which is not limited in the embodiment.

Optionally, the communication system 100 may also include other network entities such as a network controller, a mobility management entity, and the like, which is not limited in the embodiment of the disclosure.

It should be understood that equipment with a communication function in the network/system in the embodiment of the disclosure may be referred to as communication equipment. Taking the communication system 100 shown in FIG. 1 as an example, the communication equipment may include the network equipment 120 and the UE 130 with communication functions, and the network equipment 120 and the UE 130 may be the specific equipment described above, which is not iterated herein; the communication equipment may also include other equipment in the communication system 100, such as a mobility management entity (MME), a serving gateway (S-GW), a PDN gateway (P-GW), OAM entity, measurement collection entity, or the like, which is not limited in the embodiments of the disclosure.

Before introducing the embodiments of the disclosure, some related technologies are introduced first.

1. Service Type of QoE

NR QoE supports the Application Layer Measurement Collection functionality. This functionality enables the collection of application layer measurements from the UE. The supported service types include streaming services, multimedia telephony service for IP multimedia subsystem (MTSI) services, virtual reality (VR), multimedia broadcast/multicast service (MBMS), and extended reality (XR). However, an additional service type is not precluded.

2. QoE Measurement Procedure

Figure 2:
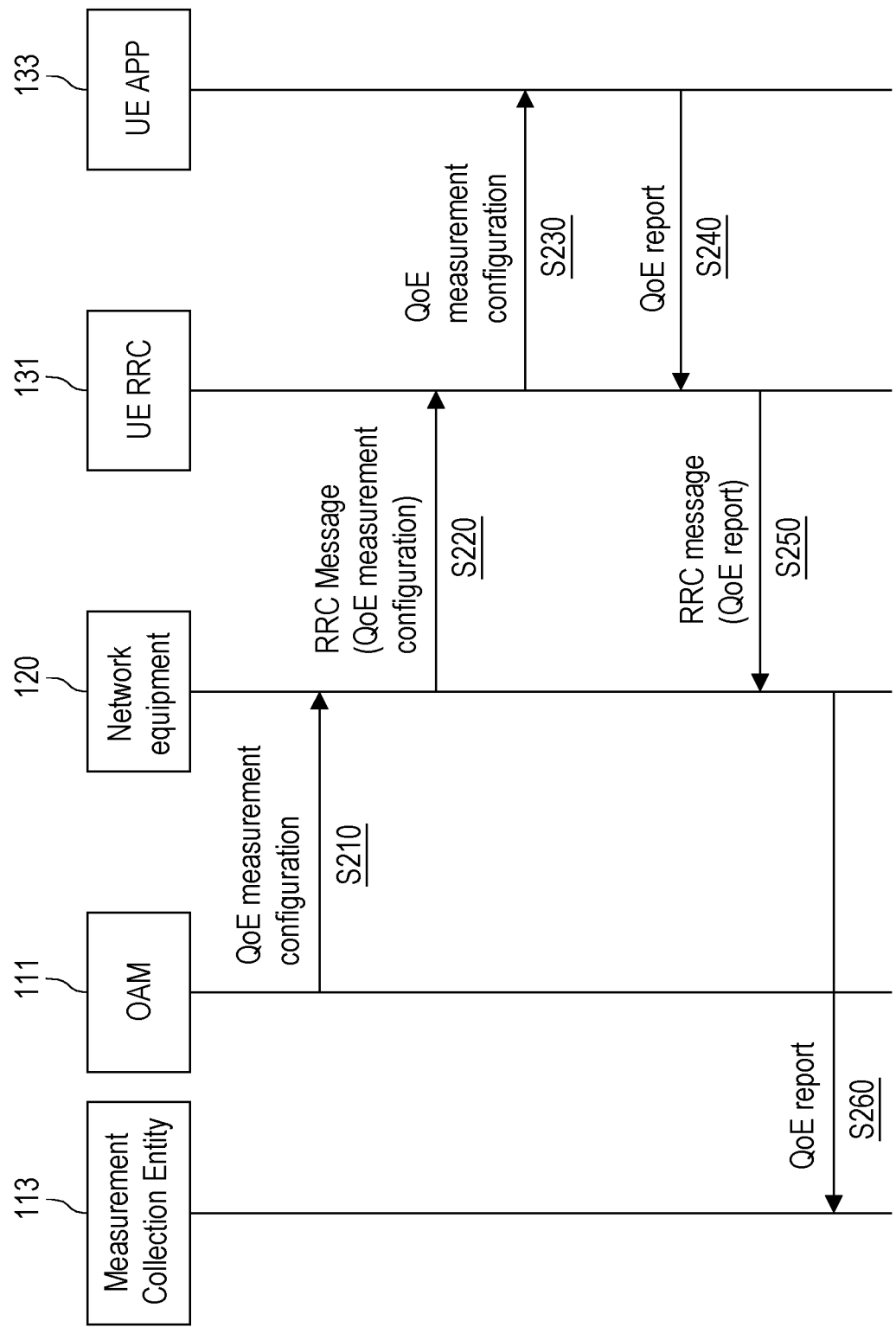
FIG. 2 is a signaling flow chart of quality of experience (QoE) procedure according to one of the exemplary embodiments of the disclosure.

FIG. 2 is a signaling flow chart of quality of experience (QoE) procedure according to one of the exemplary embodiments of the disclosure. Referring to FIG. 2, the procedure is used for activating the QoE measurement configured by OAM 111. The OAM 111 sends the QoE measurement configuration to the network equipment 120 (step 210). The network equipment 120 finds multiple qualified UEs 130 that meet the criteria (e.g. area scope, application layer capability, service type, etc.) or a single specific UE 130. The network equipment 120 sends the QoE measurement configuration carried by a RRC message to the radio resource control (RRC) layer 131 of the specific UE 130 or each qualified UE 130 (step S220). UE RRC layer 131 forwards the QoE measurement configuration to UE application (APP) layer 133. When a session starts, the UE APP layer 133 checks the criteria (e.g. cell list, service type, etc.) of the QoE measurement configuration, and, if the criteria are met, starts QoE measurement and reporting.

UE APP layer 133 forwards the QoE report to the UE RRC layer 131 (step 240). UE RRC layer 131 sends the QoE report to the network equipment 120 via a separate signaling radio bearer (SRB) (separate from current SRBs) in NR (step 250), as this reporting is a lower priority than other SRB transmissions. Then, the network equipment 120 transmits the QoE report to the final destination configured (e.g. the measurement collection entity (MCE) 113 or a trace-collection entity (TCE)) (step S260).

3. RAN Overload

In case of RAN overload in standalone connectivity, RAN can stop new QoE measurement configurations, release existing QoE measurement configurations and pause QoE measurement reporting. RRC signaling is used by the network equipment 120 to indicate the UE 130 to pause or resume the QoE reporting. Potential solutions of pause/resume mechanism need detailed technical specification of the procedures, e.g. pause/resume for all QoE reports or pause/resume per QoE configuration, how long can the UE store the reports, the limit for stored reports size, etc.

4. RAN Visible QoE Information Reporting By UE

The RAN (e.g., the network equipment 120) may not be able to understand or make use of the legacy QoE metrics, as they are assembled by the OAM, sent inside containers and intended to be processed by the Measurement Collection Entity in the network. If the RAN needs to make use of the QoE concept, there might be requirements that QoE information should be visible by the RAN. RAN visible QoE information is simplified QoE information abstracted from QoE metrics by UE, which the RAN may use for various types of optimizations.

An NG-RAN node assembles and sends the RAN visible QoE configuration to a UE, which may be sent along with the QoE measurement configuration container transmitted from the OAM, directly or via the CN.

The UE receives and applies the RAN visible QoE configuration and/or QoE measurement configuration container. The RAN visible QoE configuration may be so that the corresponding RAN visible QoE information that is reported can be a unique value or a combination of values reflecting the QoE metrics useful for RAN (such as buffer level). The RAN visible report is provided from the application layer of the UE to the UE's RRC layer by means of an AT command. The UE's RRC layer then includes the RAN visible report, along with the QoE report container, but as a separate IE, in the MeasReportAppLayer IE, and sends it to the RAN.

One or more embodiments of the disclosure provide a method related to reporting management, which provides partial reporting selectively per QoE measurement configuration and/or selectively per RAN visible QoE configuration during pause state of QoE reporting.

Figure 3:
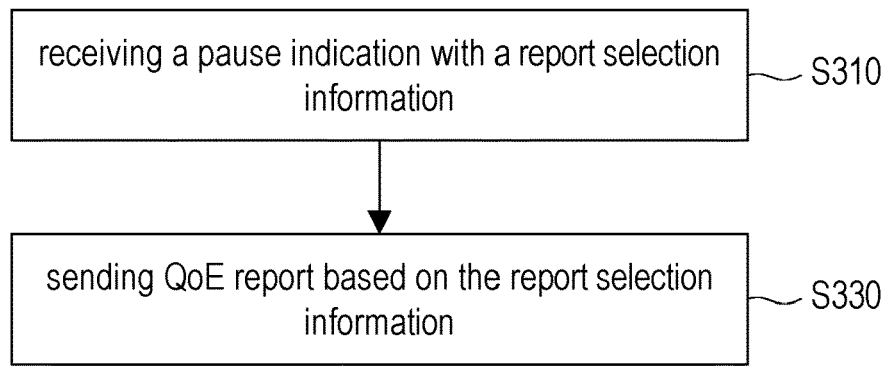
FIG. 3 is a flow chart of a method adapted for user equipment (UE) according to one of the exemplary embodiments of the disclosure.

FIG. 3 is a flow chart of a method adapted for user equipment (UE) 130 according to one of the exemplary embodiments of the disclosure. Referring to FIG. 3, the UE 130 receives a pause indication with report selection information (step S310). The UE 130 sends one or more QoE reports based on the report selection information (step S330).

Specifically, the pause indication is sent from network equipment 120. The pause indication is an indication of an action resulting in temporary stopping of QoE measurement reporting. The pause indication is unicast or broadcast from the network equipment 120. Optionally, the QoE measurement could be an application layer measurement configured by OAM. Alternatively, the QoE measurement could be the measurements on the radio layer. Alternatively, the QoE measurement is related to RAN visible QoE, which includes RAN visible QoE metrics (such as corruption duration, round-trip time, or jitter duration) and RAN visible QoE values.

In one embodiment, the pause indication is related to RAN overload. For example, the network equipment 120 detects RAN overload, and UE 130 receives the pause indication from the network equipment 120 in response to the RAN overload. In other embodiments, the pause indication may be triggered by other events such as malfunction or power issues.

On the other hand, the resume is an action resulting in the resumption of a previously paused QoE measurement reporting. In one embodiment, UE 130 may receive a resume indication from network equipment 120. The resume indication is an indication of the resume action.

Figure 4:
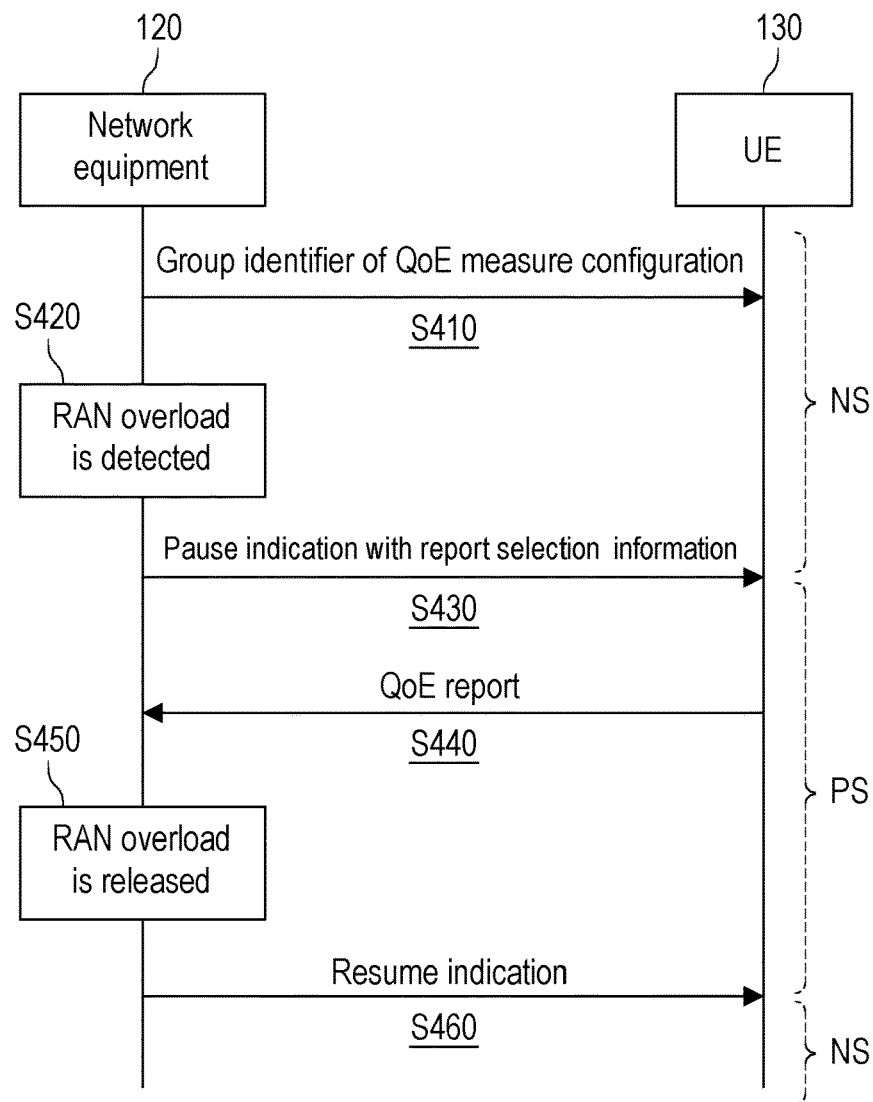
FIG. 4 is a signaling flow chart of QoE procedure with pause and resume mechanism according to one of the exemplary embodiments of the disclosure.

For example, FIG. 4 is a signaling flow chart of QoE procedure with pause and resume mechanism according to one of the exemplary embodiments of the disclosure. Referring to FIG. 4, RAN overload is detected by the network equipment 120 (step S420). The network equipment 120 sends a pause indication to UE 130 (step S430). When the UE 130 receives the pause indication, the state of QoE measurement reporting would be changed from normal state NS to pause state PS of QoE reporting. Furthermore, RAN overload is released later (step S450). The network equipment 120 sends a resume indication to UE 130 (step S460). When the UE 130 receives the resume indication, the state of QoE measurement reporting would be changed from pause state PS to normal state NS of QoE reporting.

It should be noticed that the pause/resume mechanism may be adapted for all QoE reports (such as RAN visible report or normal QoE report), per QoE measurement configuration, or per RAN visible QoE configuration.

In one embodiment, the report selection information is related to avoidance of report pause for one or more QoE measurement configurations. One or more QoE reports (called first QoE reports hereinafter) may be associated with the QoE measurement configuration which is related to avoidance of report pause indicated in the report selection information. During the pause state PS, the one or more first QoE reports associated with the QoE measurement configuration related to avoidance of report pause, are sent.

In one embodiment, one or more second QoE reports other than the one or more first QoE reports are paused based on the report selection information. The second QoE report is not associated with the QoE measurement configuration which is related to avoidance of report pasuse indicated in the report selection information. It means that sending of the first QoE report would not be paused during the pause state PS of QoE reporting (shown as step S440 of FIG. 4). However, sending of the second QoE report which is not associated with the QoE measurement configuration indicated by the report selection information would be paused during the pause state PS of QoE reporting.

In one embodiment, the UE 130 receives a group identifier of a QoE measurement configuration from the network equipment 120 (shown as step S410 of FIG. 4). The group identifier (or refer as to class, attribute, or tag) represents a group which none or at least one QoE measurement configurations. Alternatively, the group identifier represents one of QoE measurement configurations or RAN visible configurations. In one embodiment, the group identifier is an identification of QoE measurement configuration. In another embodiment, the group identifier is an identification of a RAN visible QoE configuration. In one embodiment, the group identifier is a service type and/or a radio resource control (RRC) level identification (ID) (such as reference ID or shorten ID). The service type could be, for example, MTSI, VR, MBMS, XR service, or the like. The group identifier could be a number, a symbol, an alphabet, or a text, and the embodiment is not limited thereto.

In one embodiment, the group identifier of a QoE measurement configuration is related to a QoE priority. For example, the QoE priority of a QoE measurement configuration is lower than the QoE priority of RAN visible QoE configuration. Furthermore, the report selection information is a priority threshold. In one embodiment of step S440 of FIG. 4, UE 130 may further compare the QoE priority of the QoE measurement configuration with the priority threshold, and send the QoE measurement configuration based on a compared result of the priority threshold. In other words, the first QoE report is selected based on the compared result between the QoE priority and the priority threshold.

Figure 5A:
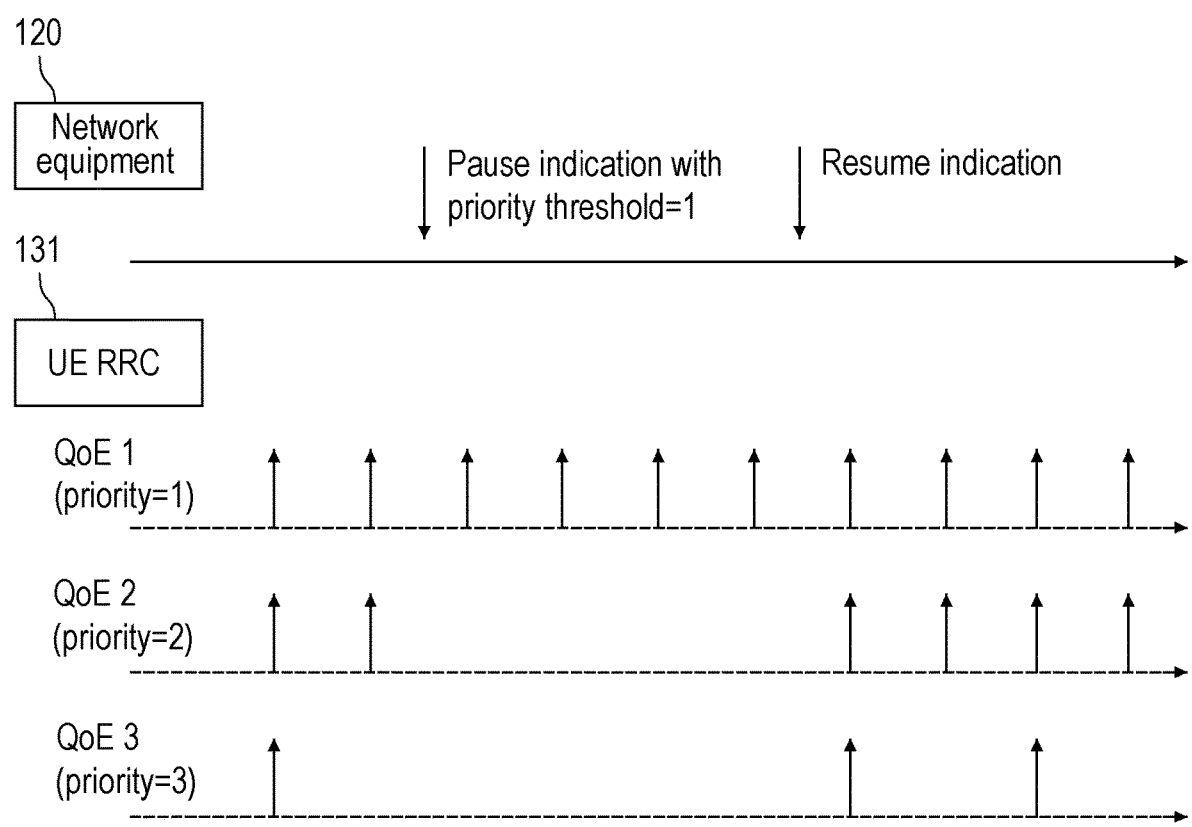
FIG. 5A is a schematic diagram illustrating partial reporting according to one of the exemplary embodiments of the disclosure.

For example, FIG. 5A is a schematic diagram illustrating partial reporting according to one of the exemplary embodiments of the disclosure. Referring to FIG. 5A, the report selection information is the priority threshold and set as 1. The QoE priority of QoE measurement configuration bold QoE 1 is 1, the QoE priority of QoE measurement configuration QoE 2 is 2, and the QoE priority of QoE measurement configuration QoE 3 is 3. It is assumed that the priority with a less value of QoE priority is higher, and the priority with a larger value of QoE priority is lower. The values of QoE priorities of QoE measurements configuration QoE 2 and QoE 3 are larger than the priority threshold (i.e., the compared result), and it means the QoE priorities of QoE measurements configuration QoE 2 and QoE 3 are lower. The value of QoE priority of QoE measurement configuration QoE 1 is less than the priority threshold (i.e., the compared result), and it means the QoE priority of QoE measurement configuration QoE 1 is higher. Therefore, in response to receiving the pause indication, the reporting of QoE measurement configurations QoE 2 and QoE 3 is paused (i.e., the reports of QoE measurement configurations QoE 2 and QoE 3 are second QoE reports), and the reporting of QoE measurement configuration QoE 1 remains unchanged (i.e., the report of QoE measurement configuration QoE 1 is the first QoE report and would be sent by UE RRC layer 131).

In one embodiment, the group identifier of a QoE measurement configuration is related to a report volume. More QoEs with larger report volumes may result in a higher probability of RAN overload. Furthermore, the report selection information is a volume threshold. In one embodiment of step S440 of FIG. 4, UE 130 may further compare the report volume of the QoE report with the volume threshold, and send the QoE report based on a compared result of the volume threshold. In other words, the first QoE report is selected based on the compared result between the report volume and the volume threshold. In some embodiments, the report volume is related to how long can UE 130 store QoE reports.

Figure 5B:
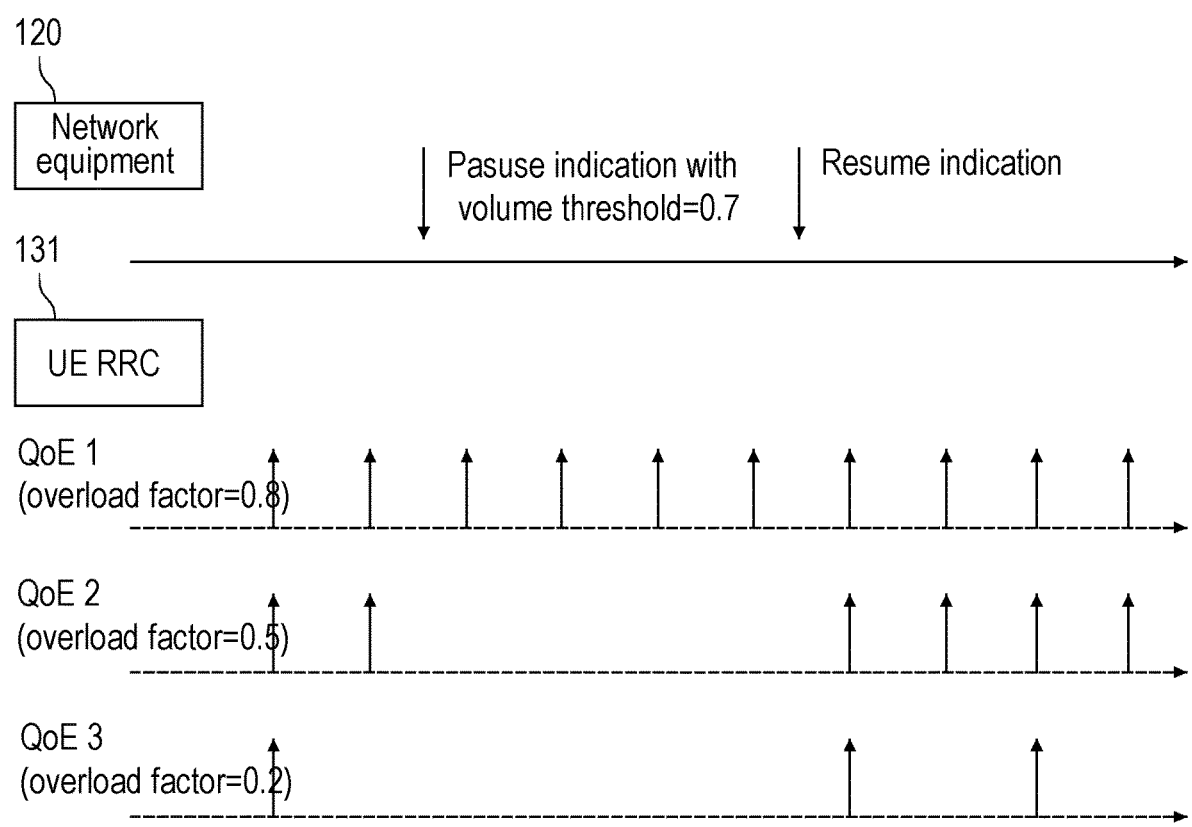
FIG. 5B is a schematic diagram illustrating partial reporting according to one of the exemplary embodiments of the disclosure.

For example, FIG. 5B is a schematic diagram illustrating partial reporting according to one of the exemplary embodiments of the disclosure. Referring to FIG. 5B, the report selection information is the volume threshold and set as 0.7. An overload factor is related to the report volume. It is assumed that the report volume with a less value has a higher overload factor, and the report volume with a larger value has a lower overload factor. The overload factor of QoE measurement configuration QoE 1 is 0.8, the overload factor of QoE configuration measurement QoE 2 is 0.5, and the overload factor of QoE measurement configuration QoE 3 is 0.2. The values of overload factors of QoE measurement configurations QoE 2 and QoE 3 are less than the volume threshold (i.e., the compared result), and it means the report volumes of QoE measurement configurations QoE 2 and QoE 3 are larger. The value of overload factor of QoE measurement configuration QoE 1 is larger than the volume threshold (i.e., the compared result), and it means the report volume of QoE measurement configuration QoE 1 is less.

Therefore, in response to receiving the pause indication, the reporting of QoE measurement configurations QoE 2 and QoE 3 is paused (i.e., the reports of QoE measurement configurations QoE 2 and QoE 3 are second QoE reports), and the reporting of QoE measurement configuration QoE 1 remains unchanged (i.e., the report of QoE measurement configuration QoE 1 is the first QoE report and would be sent by UE RRC layer 131).

In one embodiment, the report selection information is a bitmap configuration. Each bit of the bitmap configuration corresponds to one group identifier of QoE measurement configuration (i.e., one bit per QoE measurement configuration). Optionally, the relationship between bitmap configuration and QoE measurement configuration may be in order. Alternatively, the relationship between bitmap configuration and QoE measurement configuration may be a flexible one-to-many mapping. In one embodiment of step S440 of FIG. 4, UE 130 may further compare the group identifier of the QoE measurement configuration with the bitmap configuration, and send the QoE report based on a compared result of the bitmap configuration. In other words, the first QoE report is selected based on the compared result of the group identifier and the bitmap configuration.

Figure 6:
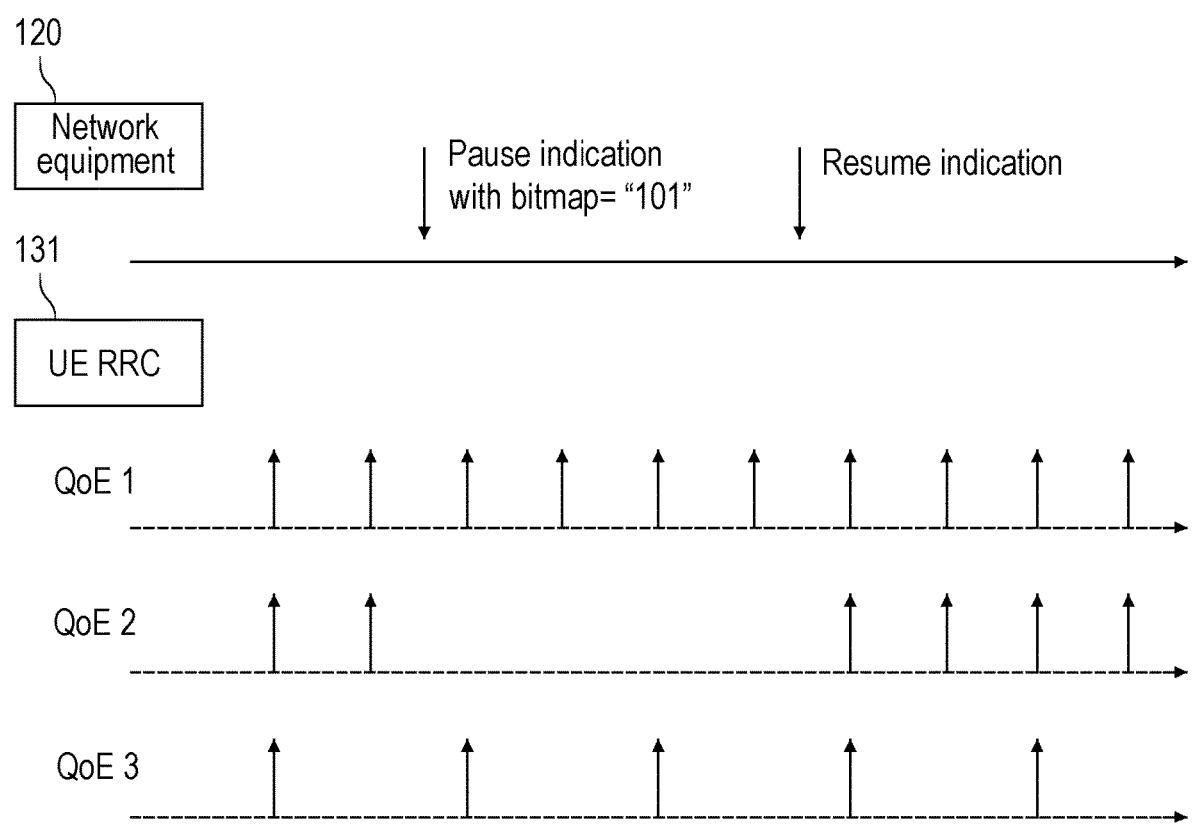
FIG. 6 is a schematic diagram illustrating partial reporting according to one of the exemplary embodiments of the disclosure.

For example, FIG. 6 is a schematic diagram illustrating partial reporting according to one of the exemplary embodiments of the disclosure. Referring to FIG. 6, the relationship between bitmap configuration and QoE measurement configuration is in order. The first bit represents QoE configuration measurement QoE 1, the second bit represents QoE configuration measurement QoE 2, and the third bit represents QoE measurement configuration QoE 3. If the bitmap configuration is "101", merely the reporting of QoE measurement configuration QoE 2 is paused (i.e., the report of QoE measurement configuration QoE 2 is second QoE report) because the second bit of the bitmap configuration is "0", and the reporting of QoE measurements QoE 1 and QoE 3 remains unchanged (i.e., the reports of QoE measurement configurations QoE 1 and QoE 3 are the first QoE report and would be sent by UE RRC layer 131) because the first and third bits of the bitmap configuration are "1".

In one embodiment, the group identifier is related to an unique identifier of a QoE measurement configuration. The report selection information may include a list of unique identifiers. It means one or more unique identifiers would be selected. In step S440 of FIG. 4, UE 130 may further compare the group identifier of the QoE measurement configuration with the unique identifiers of the list, and send the QoE report based on a compared result of the unique identifiers of the list. In other words, the first QoE report is selected based on a compared result of the group identifier and the unique identifiers of the list. The compared result would be the unique identifier is the same as the group identifier of a QoE measurement configuration or different from the group identifier of the QoE measurement configuration.

Figure 7:
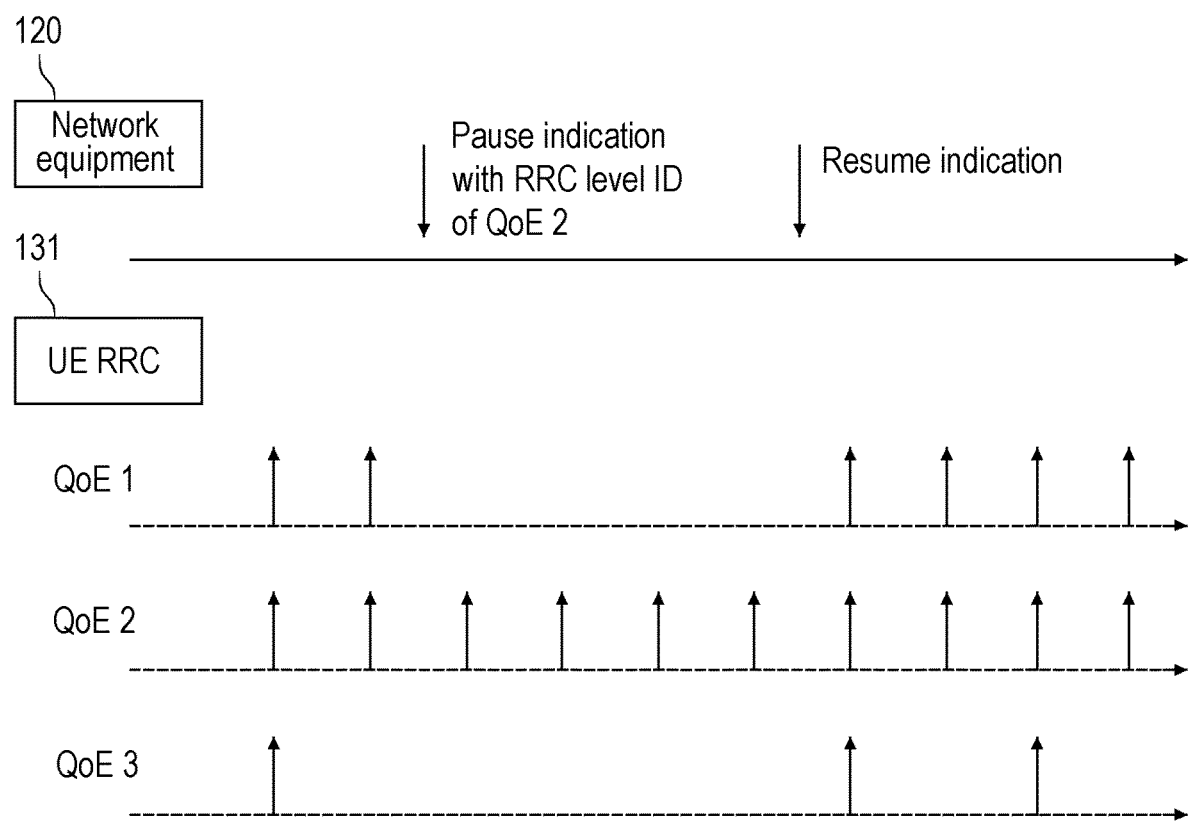
FIG. 7 is a schematic diagram illustrating partial reporting according to one of the exemplary embodiments of the disclosure.

For example, FIG. 7 is a schematic diagram illustrating partial reporting according to one of the exemplary embodiments of the disclosure. Referring to FIG. 7, the report selection information includes RRC level ID of QoE measurement configuration QoE 2. Therefore, in response to receiving the pause indication, the reporting of QoE measurement configurations QoE 1 and QoE 3 is paused (i.e., the reports of QoE measurement configurations QoE 1 and QoE 3 are second QoE reports), and the reporting of QoE measurement configuration QoE 2 remains unchanged (i.e., the report of QoE measurement configuration QoE 2 is the first QoE report and would be sent by UE RRC layer 131).

In one embodiment, UE 130 receives a resume indication, and sends one or more second QoE reports based on the resume indication in response to receiving the resume indication. The second QoE report, which is paused during the pause state PS, is resumed. Taking FIG. 7 as an example, the reporting of QoE measurements QoE 1 and QoE 3 would be resumed in response to the reception of the resume indication.

Figure 8:
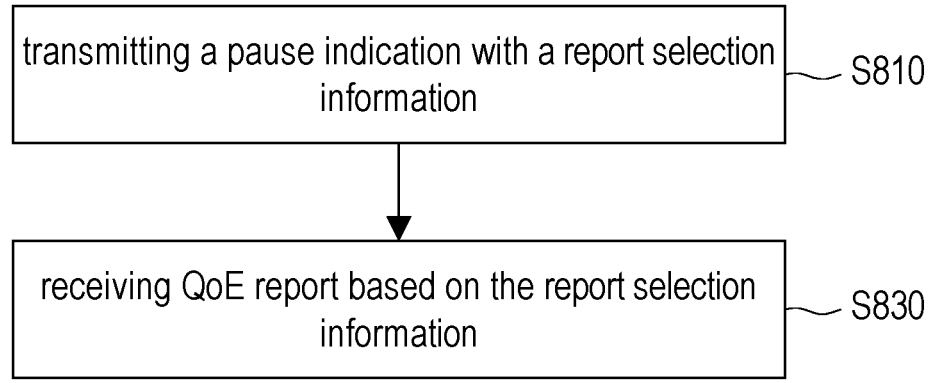
FIG. 8 is a flow chart of a method adapted for network equipment according to one of the exemplary embodiments of the disclosure.

FIG. 8 is a flow chart of a method adapted for network equipment 120 according to one of the exemplary embodiments of the disclosure. Referring to FIG. 8, network equipment 120 sends a pause indication with report selection information (step S810). The network equipment 120 receives one or more QoE reports based on the report selection information (step S830).

The detailed description of step S810 to step S830 could be referred to FIG. 3-FIG. 7 and would be omitted.

In one embodiment, the network equipment 120 sends a group identifier of a QoE measurement configuration to the UE 130 (shown as step S410 of FIG. 4). The group identifier (or refer as to class, attribute, or tag) represents one of QoE measurement configurations. In one embodiment, the group identifier is an identification of QoE measurement configuration. In another embodiment, the group identifier is an identification of a RAN visible QoE configuration. In one embodiment, the group identifier is a service type and/or a radio resource control (RRC) level identification (ID) (such as reference ID or shorten ID).

In one embodiment, the group identifier of a QoE measurement configuration is related to a QoE priority. The report selection information is a priority threshold, and the first QoE report is selected based on a compared result between the QoE priority and the priority threshold.

In one embodiment, the group identifier is related to a report volume. The report selection information is a volume threshold, and the first QoE report is selected based on a compared result between the report volume and the volume threshold.

In one embodiment, the report selection information is a bitmap configuration. One bit of the bitmap configuration corresponding to the group identifier, and the first QoE report is selected based on a compared result of the group identifier and the bitmap configuration.

In one embodiment, a group identifier is related to an unique identifier of a QoE measurement configuration, the report selection information may include a list of multiple unique identifiers, and the first QoE report is selected based on the list of the unique identifier.

In one embodiment, the network equipment 120 may not receive one or more second QoE report based on the report selection information. The second QoE report is not associated with the QoE measurement configuration which is related to avoidance of report pause indicated in the report selection information.

In one embodiment, the network equipment 120 sends a resume indication (shown as step S460 of FIG. 4), and receives one or more second QoE reports based on the resume indication in response to sending the resume indication (shown as FIG. 5A-FIG. 7). The second QoE report would be received after the resume indication is sent.

However, instead of report selection information, the first QoE report could be selected based on a triggered event.

Figure 9:
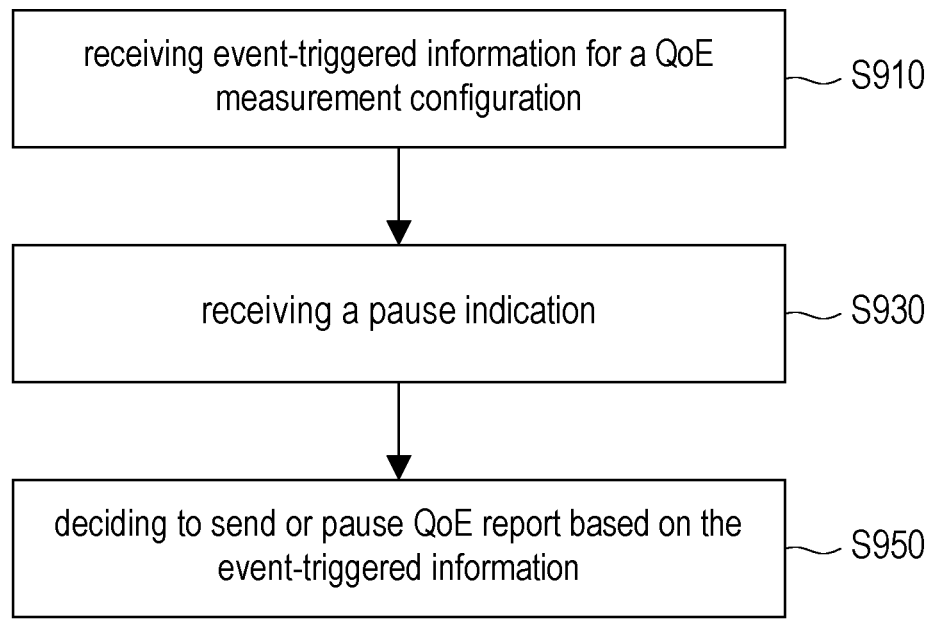
FIG. 9 is a flow chart of a method adapted for UE according to one of the exemplary embodiments of the disclosure.

FIG. 9 is a flow chart of a method adapted for UE 130 according to one of the exemplary embodiments of the disclosure. Referring to FIG. 9, UE 130 receives event-triggered information for a QoE measurement configuration (step S910). The UE 130 receives a pause indication (step S930). The UE 130 decides to send or pause one or more QoE reports based on the event-triggered information (step S950).

Specifically, the QoE report is associated with the QoE measurement configuration. In one embodiment, the event-triggered information is related to an event that a measurement result corresponding to the QoE measurement configuration satisfies a criterion, and the UE 130 decides to send or pause the one or more QoE reports based on the event-triggered information.

In one embodiment, a criterion is related to a measurement result corresponding to the QoE measurement configuration. In one embodiment, the measurement result corresponding to the QoE measurement configuration is included in radio access network (RAN)-visible QoE information. For example, the measurement result is RAN visible QoE information (or RAN visible QoE value) reported by UE 130.

In one embodiment, the metric of the RAN visible QoE information could be the corruption duration for streaming services. If the network equipment 120 knows the results of this metric, the network equipment 120 could adjust the resource allocation of the UE 130 to satisfy the user experience.

In another embodiment, the metric of the RAN visible QoE information could be the buffer level for streaming services. If the network equipment 120 knows the results of buffer level, the network equipment 120 can adjust the resource allocation of the UE 130, to ensure there is enough buffer for the streaming, thereby improve the scheduling efficiency.

In other embodiments, the metric of the RAN visible QoE information could be other metrics as defined in 3GPP TR 38.890 or the likes. In still another embodiment, the measurement result could be derived from data of other QoE metrics through a model/function.

The difference between the pause indication of this embodiment and the above-mentioned embodiments (such as the embodiments of FIG. 3-FIG. 8) is that the pause indication of this embodiment is received without report selection information as mentioned in previous embodiments. However, one or more first QoE reports having a measurement result corresponding to the QoE measurement configuration which satisfies a criterion are sent, and one or more second QoE reports having a measurement result corresponding to the QoE measurement configuration which does not satisfy the criterion are paused. In other words, the first QoE report is selected based on the triggered event.

Figure 10:
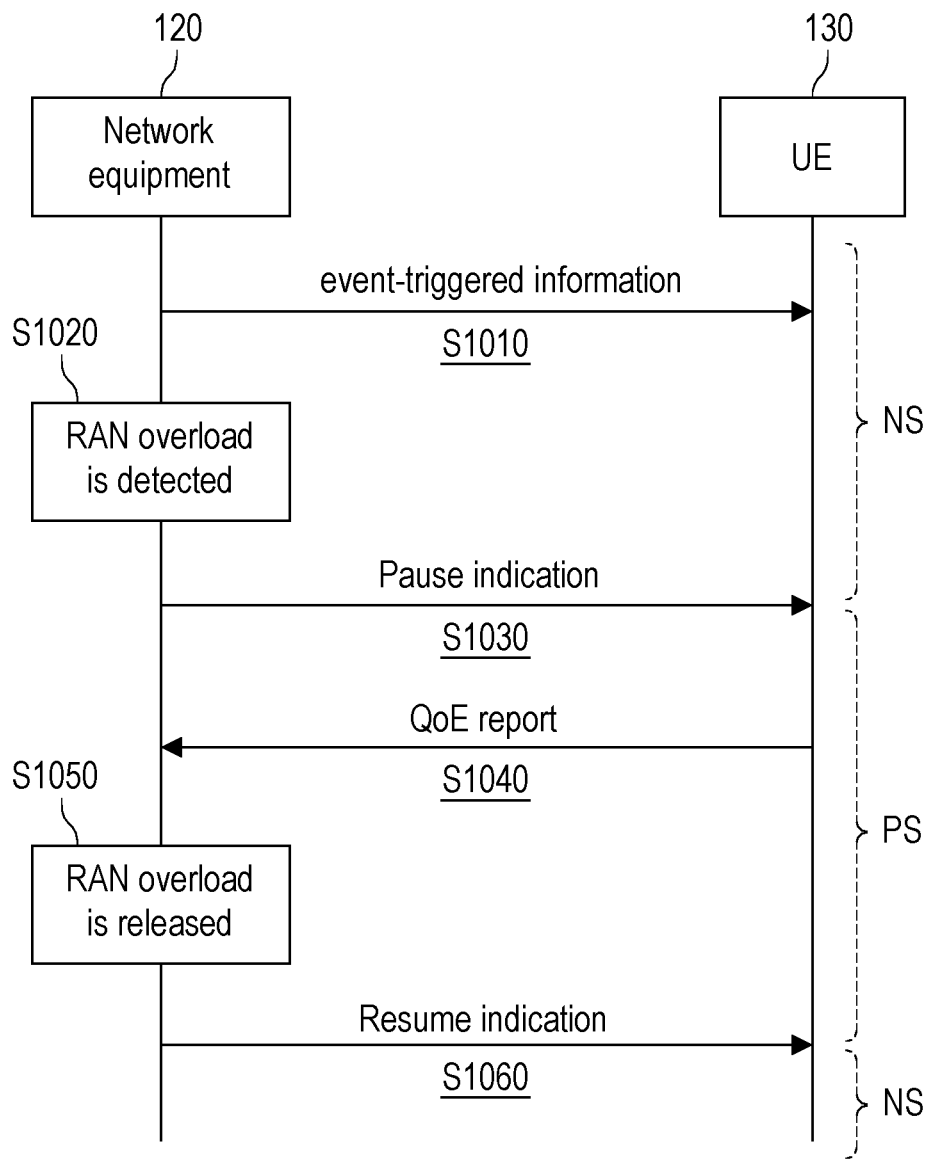
FIG. 10 is a signaling flow chart of QoE procedure with pause and resume mechanism according to one of the exemplary embodiments of the disclosure.

FIG. 10 is a signaling flow chart of QoE procedure with pause and resume mechanism according to one of the exemplary embodiments of the disclosure. Referring to FIG. 10, network equipment 120 sends event-triggered information for a QoE measurement configuration to UE 130 (step S1010). RAN overload is detected by the network equipment 120 (step S1020). The network equipment 120 sends a pause indication to UE 130 (step S1030). When the UE 130 receives the pause indication, the state of QoE measurement reporting would be changed from normal state NS to pause state PS of QoE reporting. Furthermore, RAN overload is released later (step S1050). The network equipment 120 sends a resume indication to the UE 130 (step S1060). When the UE 130 receives the resume indication, the state of QoE measurement reporting would be changed from pause state PS to normal state NS of QoE reporting.

The pause/resume mechanism may be adapted for all QoE reports (such as RAN visible report or normal QoE report), per QoE measurement configuration, or per RAN visible QoE configuration.

In one embodiment of step S950 of FIG. 9 or step S1040 of FIG. 10, UE 130 compares the measurement result corresponding to the QoE measurement configuration with a measurement threshold, and decides to send or pause one or more QoE reports based on a compared result of the measurement threshold.

Taking corruption duration as an example, the UE 130 compares the value or measured result corresponding to the corruption duration with a duration threshold (i.e., the measurement threshold). The UE 130 may consider the entering condition for an event to be satisfied in response to the first condition, and the leaving condition for the event to be satisfied in response to the second condition.

For example, the first condition is:

$$Ms-Hys>Thresh \quad (1).$$

The second condition is:

$$Ms+Hys<Thresh \quad (2)$$

Ms is the measurement result corresponding to corruption duration of the RAN visible QoE metrics, not taking into account any offsets. Hys is the hysteresis parameter for this event (i.e. hysteresis as defined within reportConfigNR-QoE for this event), however, the hysteresis parameter could be omitted based on actual requirement. Thresh is the measurement threshold for this event (i.e. q1-Threshold as defined within reportConfigNR-QoE for this event). Ms is expressed in microsecond (ms). Hys is expressed is in the same unit as Ms. Thresh is expressed in the same unit as Ms.

Figure 11:
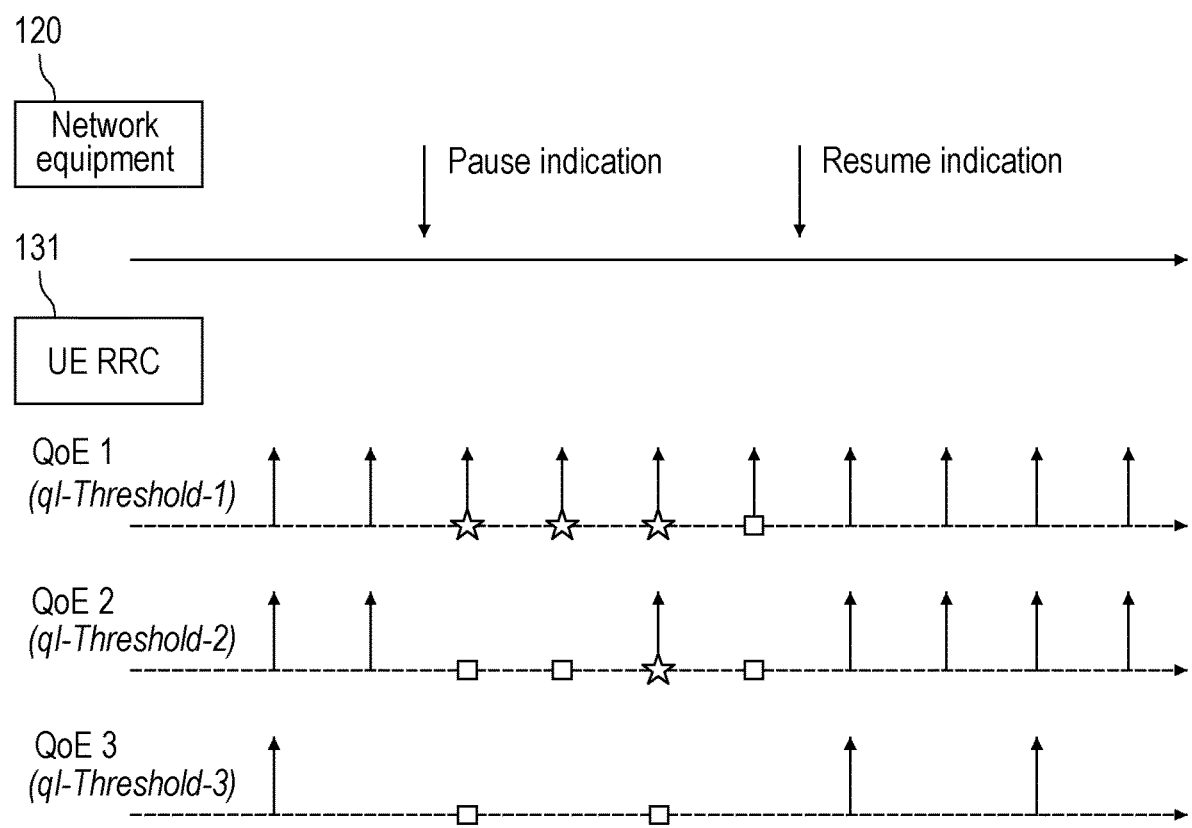
FIG. 11 is a schematic diagram illustrating partial reporting according to one of the exemplary embodiments of the disclosure.

FIG. 11 is a schematic diagram illustrating partial reporting according to one of the exemplary embodiments of the disclosure. Referring to FIG. 11, the measurement threshold corresponding to QoE measurement configuration QoE 1 is q1-Threshold-1, the measurement threshold corresponding to QoE measurement configuration QoE 2 is q1-Threshold-2, and the measurement threshold corresponding to QoE measurement configuration QoE 3 is q1-Threshold-3. The star sign represents the event that satisfies its corresponding criterion, for example, the measurement result corresponding to QoE measurement configuration QoE 1 is larger than the measurement threshold q1-Threshold-1, which may be in conjunction with a hysteresis parameter as the function (1) optionally. Therefore, the report of the QoE measurement configuration QoE 1 would be considered as the first QoE report of the event and would be sent. On the other hand, the square sign represents the event that does not satisfy its corresponding criterion, for example, the measurement result corresponding to QoE measurement configuration QoE 3 is less than the measurement threshold q1-Threshold-3. Therefore, the report of QoE measurement configuration QoE 3 would be considered as a second QoE report of the event and would be paused.

In one embodiment, the event-triggered information is related to an event that a random value which is slected randomly corresponding to the QoE measurement configuration satisfies a criterion, and the UE 130 decides to send or pause the at least one QoE report based on the event-triggered information. For example, the criterion could be a check factor of a report check. The report check could be related to a check of report volume, priority, importance, user requirement, service requirement, or the like, and the embodiment is not limited thereto. Optionally, the check factor may be a value or symbol that represents the state or measurement result of the report check.

In one embodiment of step S950 of FIG. 9 or step S1040 of FIG. 10, UE 130 compares the random value corresponding to the QoE measurement configuration with a threshold, and decides to send or pause one or more QoE reports based on a compared result of the threshold. In other words, one or more first QoE reports are selected based on a compared result between the random value of the QoE measurement and the threshold.

In one embodiment, UE 130 selects a value randomly based on a random distribution, to achieve a random selection. The random distribution could be, for example, uniform distribution, Gaussian distribution, or other distributions.

For example, network equipment 120 configures UE 130 that QoE measurement configuration QoE 1 has check factor=0.8, QoE measurement configuration QoE 2 has check factor=0.5, and QoE measurement configuration QoE 3 has check factor=0.2. The check factor is the threshold. UE 130 may draw a random number 'rand' uniformly distributed in the range: 0≤rand<1. If the random number 'rand' is lower than a value indicated by the corresponding check factor (i.e., an event satisfies a criterion), its QoE report would be considered as a first QoE report of the triggered event and would be sent to the network equipment 120 during PS state. On the other hand, if the random number 'rand' does not lower the value indicated by the corresponding check factor (i.e., an event does not satisfy a criterion), its QoE report would be considered as a second QoE report and would be paused (i.e., not sent).

In one embodiment, the UE 130 may receive a resume indication from a network equipment 120, and send the one or more QoE reports if paused based on the resume indication in response to receiving the resume indication. The QoE report which is paused has a measurement result corresponding to the QoE measurement configuration or a random value which does not satisfy a criterion.

Figure 12:
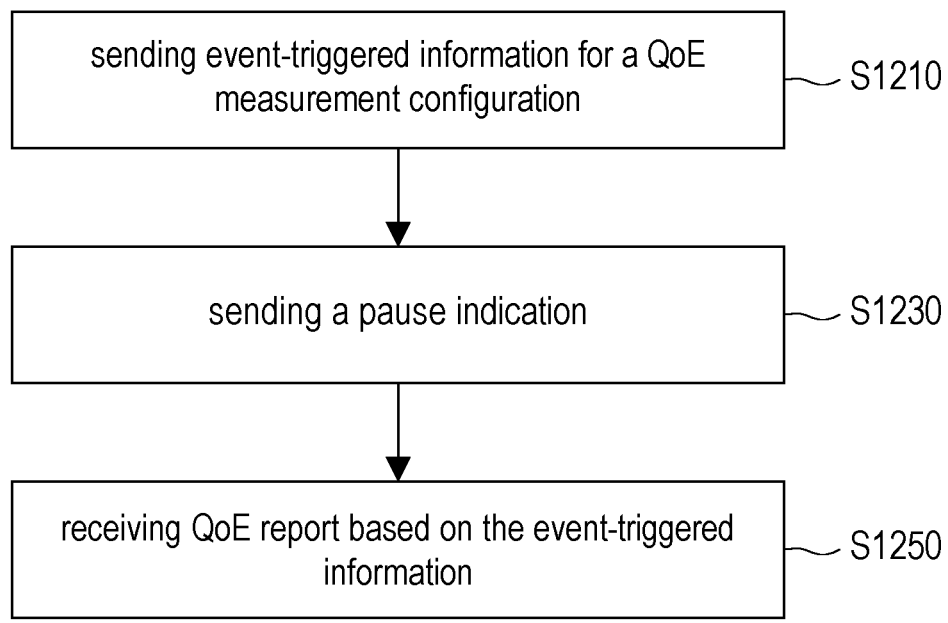
FIG. 12 is a flow chart of a method adapted for network equipment according to one of the exemplary embodiments of the disclosure.

FIG. 12 is a flow chart of a method adapted for network equipment 120 according to one of the exemplary embodiments of the disclosure. Referring to FIG. 12, network equipment 120 sends event-trigger information for a QoE measurement configuration (step S1210). The network equipment 120 sends a pause indication (step S1230). The network equipment 120 receivers one or more QoE reports based on the event-triggered information in response to sending the pause indication (step S1250).

The detailed description of step S1210 to step S1250 could be referred to FIG. 9-FIG. 11 and would be omitted. One or more QoE reports are associated with the QoE measurement configuration. In one embodiment, the event-triggered information is related to an event that a QoE measurement result corresponding to the QoE measurement configuration satisfies a criterion. Furthermore, one or more first QoE reports of the event having a QoE measurement result corresponding to the QoE measurement configuration which satisfies a criterion is received by the network equipment 120, and one or more second QoE reports having a QoE measurement result corresponding to the QoE measurement configuration which does not satisfy a criterion are not received by the network equipments 120.

In one embodiment, one or more QoE reports are sent or paused based on a compared result between the measurement result corresponding to the QoE measurement configuration and a measurement threshold.

In another embodiment, the event-triggered information is related to an event that a random value which is slected randomly corresponding to the QoE measurement configuration satisfies a criterion. In one embodiment, to send or pause one or more QoE reports is decided by the UE 130 based on a compared result between the random value corresponding to the QoE measurement configuration and a threshold.

In one embodiment, the network equipment 120 sends a resume indication (shown as step S1060 of FIG. 10), and receives one or more QoE reports if pause based on the resume indication in response to sending the resume indication (shown as FIG. 10). The second QoE report would be received after the resume indication is sent.

However, instead of either report selection information or triggered event, the first QoE report could be sent based on both report selection information triggered event.

Figure 13:
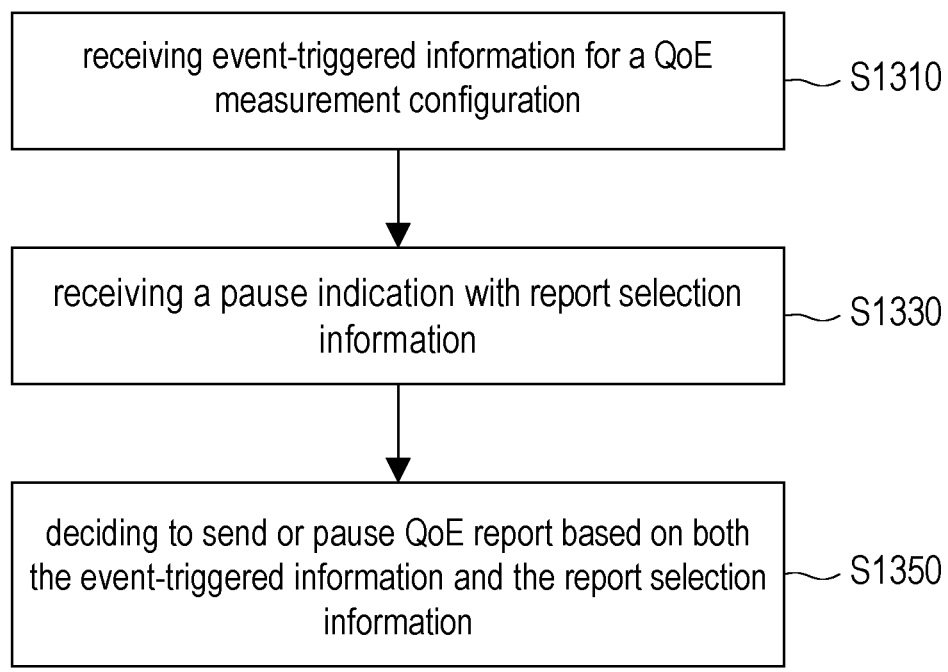
FIG. 13 is a flow chart of a method adapted for UE according to one of the exemplary embodiments of the disclosure.

FIG. 13 is a flow chart of a method adapted for UE 130 according to one of the exemplary embodiments of the disclosure. Referring to FIG. 13, UE 130 receives event-triggered information (step S1310). The UE 130 receives a pause indication with report selection information (step S1330). The UE 130 decides to send or pause one or more QoE reports based on both the report selection information and the event-triggered information (step S1350).

The detailed description of step S1310 to step S1350 could be referred to FIG. 3-FIG. 11 and would be omitted. The difference between this embodiment and the above-mentioned embodiments (such as the embodiments of FIG. 3-FIG. 11) is that both the report selection information and the event-triggered information are considered in this embodiment. It means that one or more first QoE reports are indicated by the report selection information and have the event (which satisfies a corresponding criterion).

Figure 14:
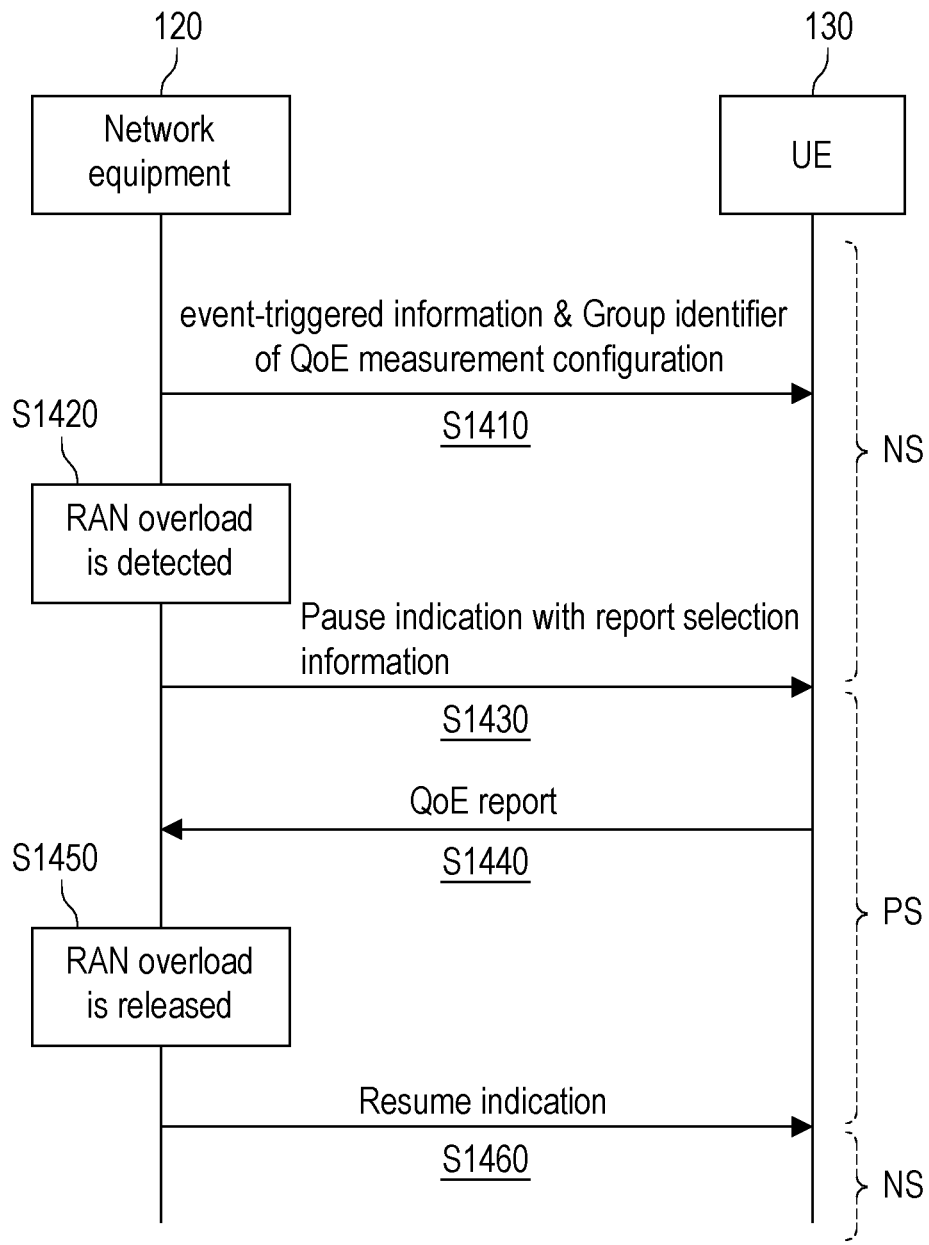
FIG. 14 is a signaling flow chart of QoE procedure with pause and resume mechanism according to one of the exemplary embodiments of the disclosure.

FIG. 14 is a signaling flow chart of QoE procedure with pause and resume mechanism according to one of the exemplary embodiments of the disclosure. Referring to FIG. 14, network equipment 120 sends event-triggered information and a group identifier of a QoE measurement configuration to UE 130 respectively or together (step S1410). RAN overload is detected by the network equipment 120 (step S1420). The network equipment 120 sends a pause indication with report selection information to UE 130 (step S1430). When the UE 130 receives the pause indication, the state of QoE measurement reporting would be changed from normal state NS to pause state PS of QoE reporting. The UE would send QoE report based on both the report selection information and the event-triggered information (step S1440). Furthermore, RAN overload is released later (step S1450). The network equipment 120 sends a resume indication to the UE 130 (step S1460). When the UE 130 receives the resume indication, the state of QoE measurement reporting would be changed from pause state PS to normal state NS of QoE reporting.

The pause/resume mechanism may be adapted for all QoE reports (such as RAN visible report or normal QoE report), per QoE measurement configuration, or per RAN visible QoE configuration.

Figure 15:
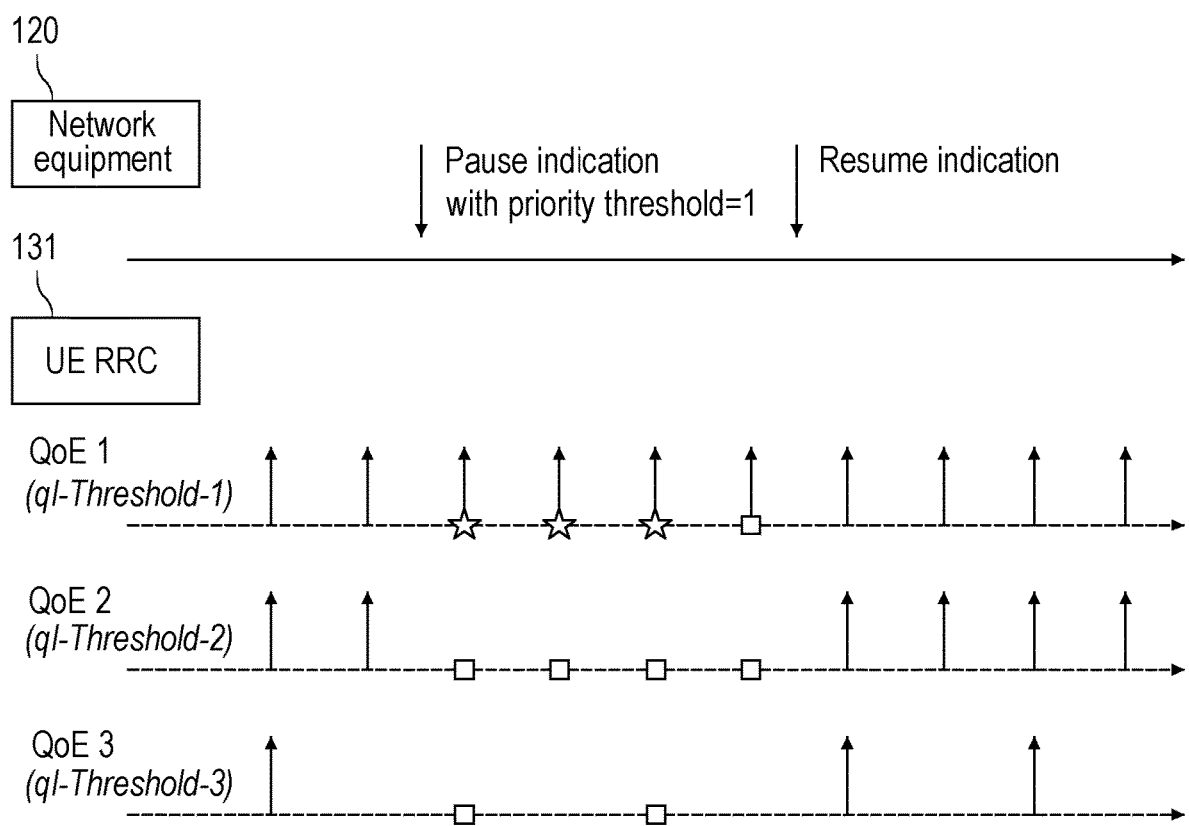
FIG. 15 is a schematic diagram illustrating partial reporting according to one of the exemplary embodiments of the disclosure.

For example, FIG. 15 is a schematic diagram illustrating partial reporting according to one of the exemplary embodiments of the disclosure. Referring to FIG. 15, it is assumed the report selection information is a priority threshold, and a criterion of an event is related to RAN visible QoE, for example, corruption duration. Network equipment 120 configures UE 130 as the QoE priority of QoE measurement configuration QoE 1 is 1, the QoE priority of QoE measurement configuration QoE 2 is 2, and the QoE priority of QoE measurement configuration QoE 3 is 3. Furthermore, the network equipment 120 configures the UE 130 as the measurement threshold corresponding to QoE measurement configuration QoE 1 is q1-Threshold-1, the measurement threshold corresponding to QoE measurement configuration QoE 2 is q1-Threshold-2, and the measurement threshold corresponding to QoE measurement configuration QoE 3 is q1-Threshold-3. The network equipment 120 sends a pause indication with the priority threshold (e.g., 1). The UE 130 would send QoE report corresponding to QoE measurement configuration QoE 1 to the network equipment 120 when the criterion of the event with the measurement threshold q1-Threshold-1 is met (shown as star sign in the figure), and pause all QoE reports corresponding to QoE measurement configurations QoE 2 and 3 because of lower QoE priority. However, the QoE report corresponding to QoE measurement configuration QoE 1 may be paused when the criterion of the event with the measurement threshold q1-Threshold-1 is not met (shown as square sign in the figure).

Figure 16:
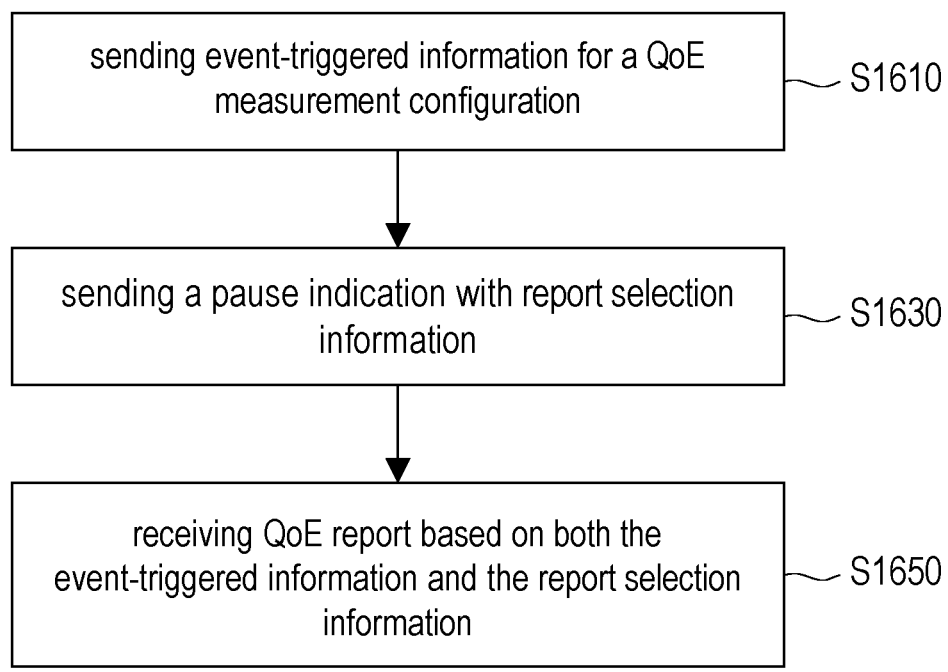
FIG. 16 is a flow chart of a method adapted for network equipment according to one of the exemplary embodiments of the disclosure.

FIG. 16 is a flow chart of a method adapted for network equipment 120 according to one of the exemplary embodiments of the disclosure. Referring to FIG. 16, network equipment 120 sends event-triggered information (step S1610). The network equipment 120 sends a pause indication with report selection information (step S1630). The network equipment 120 receives one or more QoE reports based on both the report selection information and the event-triggered information in response to sending the pause indication (step S1650).

The detailed description of step S1610 to step S1650 could be referred to step S1310 to step 1350 of FIG. 13 and would be omitted.

Figure 17:
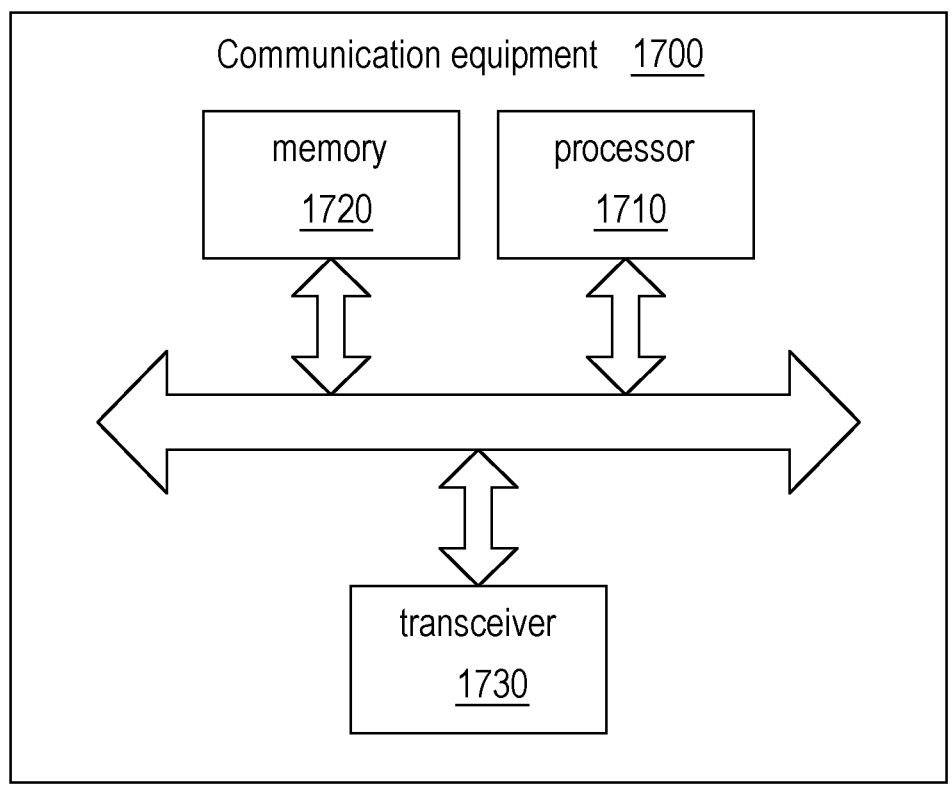
FIG. 17 is a block diagram of a communication device according to one of the exemplary embodiments of the disclosure.

FIG. 17 is a block diagram of a communication device 1710 according to one of the exemplary embodiments of the disclosure. Referring to FIG. 17, the communication device includes, but is not limited to, a processor 1710, a memory 1720, and a transceiver 1730.

The processor 1710 may include one or more processing cores, and the processor 1710 executes various functional applications and information processing by running software programs and modules. In some embodiments, the processor 1710 may be a central processing unit (CPU), a microprocessor, a microcontroller, a graphics processing unit (GPU), a digital signal processing (DSP) chip, a field-programmable gate array (FPGA). The functions of the processor 1710 may also be implemented by an independent electronic device or an integrated circuit (IC), and operations of the processor 1710 may also be implemented by software.

Optionally, as shown in FIG. 9, the communication device 1720 may further include a memory 1720. The memory 1720 is coupled to the processor 1710. In one embodiment, the processor 1710 may call and run a computer program from the memory 1720 to implement the method in the embodiment of the disclosure.

The memory 1720 may be configured to store at least one instruction, and the processor 1710 is configured to execute the at least one instruction to implement various steps in the foregoing method embodiment.

In addition, the memory 1720 can be implemented by any type of volatile or non-volatile storage apparatus or a combination thereof. The volatile or non-volatile storage apparatus includes, but is not limited to: floppy disks or optical discs, EEPROM (electrically erasable programmable read-only memory), EPROM (erasable programmable read-only memory), SRAM (static random access memory), ROM (read-only memory), magnetic memory, flash memory, and PROM (programmable read-only memory).

Optionally, as shown in FIG. 17, the communication device 1700 may further include a transceiver 1730. The transceiver 1730 is coupled to the processor 1710. The processor 1710 may control the transceiver 1730 to communicate with other devices. The transceiver 1730 may be implemented as a communication element, and the communication element may be a communication chip. Specifically, the transceiver 1730 may include a transmitter and a receiver. The transceiver 1730 may further include an antenna, and the number of antennas may be one or more.

Optionally, the communication device 1700 may specifically be a network equipment or UE in an embodiment of the disclosure, and the communication device 1700 may implement the corresponding process implemented by the network equipment or UE in various methods in the embodiment of the disclosure. For conciseness, related description is omitted.

In summary, according to the user equipment and method related to reporting management of the exemplary embodiments, QoE measurement corresponding to QoE measurement configuration indicated by report selection information and/or event-triggered information would be sent during pause state of QoE reporting. Therefore, a flexible reporting mechanism would be provided, and important, high priority, or specific QoE reporting would not be paused based on actual requirements.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method related to reporting management, adapted for a user equipment (UE), the method comprising:
   receiving event-triggered information for a quality of experience (QoE) measurement configuration;
   receiving a pause indication; and
   in response to the receiving of the pause indication, deciding to send or pause at least one QoE report based on the event-triggered information during a pause period corresponding to the pause indication, wherein the at least one QoE report is associated with the QoE measurement configuration, and sending the at least one QoE report corresponding to the event-triggered information during the pause period, wherein at least one information of the at least one QoE report relate to avoidance of report pause indicated in a report selection information, wherein the report selection information is selectively per RAN visible QoE configuration during pause state of the at least one QoE report.

2. The method according to claim 1, wherein the event-triggered information is related to an event that a measurement result corresponding to the QoE measurement configuration satisfies a criterion, and deciding to send or pause the at least one QoE report based on the event-triggered information comprises:
   comparing the measurement result corresponding to the QoE measurement configuration with a measurement threshold; and
   deciding to send or pause the at least one QoE report based on a compared result of the measurement threshold.

3. The method according to claim 2, wherein the measurement result corresponding to the QoE measurement configuration is included in radio access network (RAN)-visible QoE information.

4. The method according to claim 1, wherein the event-triggered information is related to an event that a random value which is selected randomly corresponding to the QoE measurement configuration satisfies a criterion, and deciding to send or pause the at least one QoE report based on the event-triggered information comprises:
   comparing the random value corresponding to the QoE measurement configuration with a threshold; and
   deciding to send or pause the at least one QoE report based on a compared result of the threshold.

5. The method according to claim 1, further comprising:
   receiving a resume indication; and
   sending the at least one QoE report if paused based on the resume indication in response to receiving the resume indication.

6. The method according to claim 1, wherein the pause indication carries with the report selection information, wherein the report selection information is related to avoidance of report pause for at least one of the QoE measurement configuration.

7. The method according to claim 6, wherein deciding to send or pause the at least one QoE report based on the event-triggered information comprises:
   deciding to send or pause the at least one QoE report based on both the event-triggered information and the report selection information.

8. A user equipment (UE), comprising:
   a transceiver; and
   a processor, coupled to the transceiver, and configured for:
   receiving, through the transceiver, event-triggered information for a quality of experience (QoE) measurement configuration;
   receiving, through the transceiver, a pause indication; and
   in response to the receiving of the pause indication, deciding to send or pause at least one QoE report based on the event-triggered information during a pause period corresponding to the pause indication, wherein the at least one QoE report is associated with the QoE measurement configuration, and sending the at least one QoE report corresponding to the event-triggered information during the pause period, wherein at least one information of the at least one QoE report relate to avoidance of report pause indicated in a report selection information, wherein the report selection information is selectively per RAN visible QoE configuration during pause state of the at least one QoE report.

9. The UE according to claim 8, wherein the event-triggered information is related to an event that a measurement result corresponding to the QoE measurement configuration satisfies a criterion, and the processor is further configured for:
   comparing the measurement result corresponding to the QoE measurement configuration with a measurement threshold; and
   deciding to send or pause the at least one QoE report based on a compared result of the measurement threshold.

10. The UE according to claim 9, wherein the measurement corresponding to the QoE measurement configuration is included in radio access network (RAN)-visible QoE information.

11. The UE according to claim 8, wherein the event-triggered information is related to an event that a random value which is selected randomly corresponding to the QoE measurement configuration satisfies a criterion, and the processor is further configured for:

comparing the random value corresponding to the QoE measurement configuration with a threshold; and deciding to send or pause the at least one QoE report based on a compared result of the threshold.

12. The UE according to claim 8, wherein the processor is further configured for:

receiving, through the transceiver, a resume indication; and sending, through the transceiver, the at least one QoE report if paused based on the resume indication in response to receiving the resume indication.

13. The UE according to claim 8, wherein the pause indication carries with the report selection information, wherein the report selection information is related to avoidance of report pause for the at least one of the QoE measurement configuration.

14. The UE according to claim 13, wherein the processor is further configured for:

deciding to send or pause the at least one QoE report based on both the event-triggered information and the report selection information.

* * * * *